United States Patent [19]
Bosworth

[11] Patent Number: 5,080,044
[45] Date of Patent: Jan. 14, 1992

[54] LITTER MARKETING, USE AND DISPOSAL BOX

[76] Inventor: Gerald A. Bosworth, 1569 Hanging Moss La., Gretna, La. 70056

[21] Appl. No.: 675,174

[22] Filed: Mar. 26, 1991

[51] Int. Cl.$^5$ ............................................. A01K 29/00
[52] U.S. Cl. ..................................... 119/168; 229/138
[58] Field of Search ............... 119/165, 168, 169, 170; 229/125.33, 125.19, 138

[56] References Cited

U.S. PATENT DOCUMENTS

| | | | |
|---|---|---|---|
| 3,581,977 | 11/1971 | Kirsky | 229/138 X |
| 4,014,292 | 3/1977 | Coughlin et al. | |
| 4,164,314 | 8/1979 | Edgar | |
| 4,501,226 | 2/1985 | Bienvenu et al. | |
| 4,548,160 | 10/1985 | Feitelson | 119/168 |
| 4,628,863 | 12/1986 | Eichenauer | 119/168 |
| 4,779,567 | 10/1988 | Smith | |
| 4,782,788 | 11/1988 | Arcand | 119/168 |
| 4,800,842 | 1/1989 | Jones, Jr. | |

FOREIGN PATENT DOCUMENTS 2608012 6/1988 France ........................ 119/168

Primary Examiner—Gene Mancene
Assistant Examiner—R. Thomas Price
Attorney, Agent, or Firm—Fleit, Jacobson, Cohn, Price, Holman & Stern

[57] ABSTRACT

A litter marketing, use and disposal box assembly is provided of generally rectangular shape and the upper marginal edges of the sides and ends of the box include upwardly and outwardly inclined flaps joined together by integral inwardly foldable corner portions. After the box has been used, the side and end flaps may be folded inwardly over the top of the box to close the same and the side and end flaps include coacting structure for sealing the closed box against leakage of litter material therefrom, one side of the box including an outwardly projecting handle supported therefrom whereby the used and sealed closed box may be readily transported to a point of refuse disposal.

10 Claims, 3 Drawing Sheets

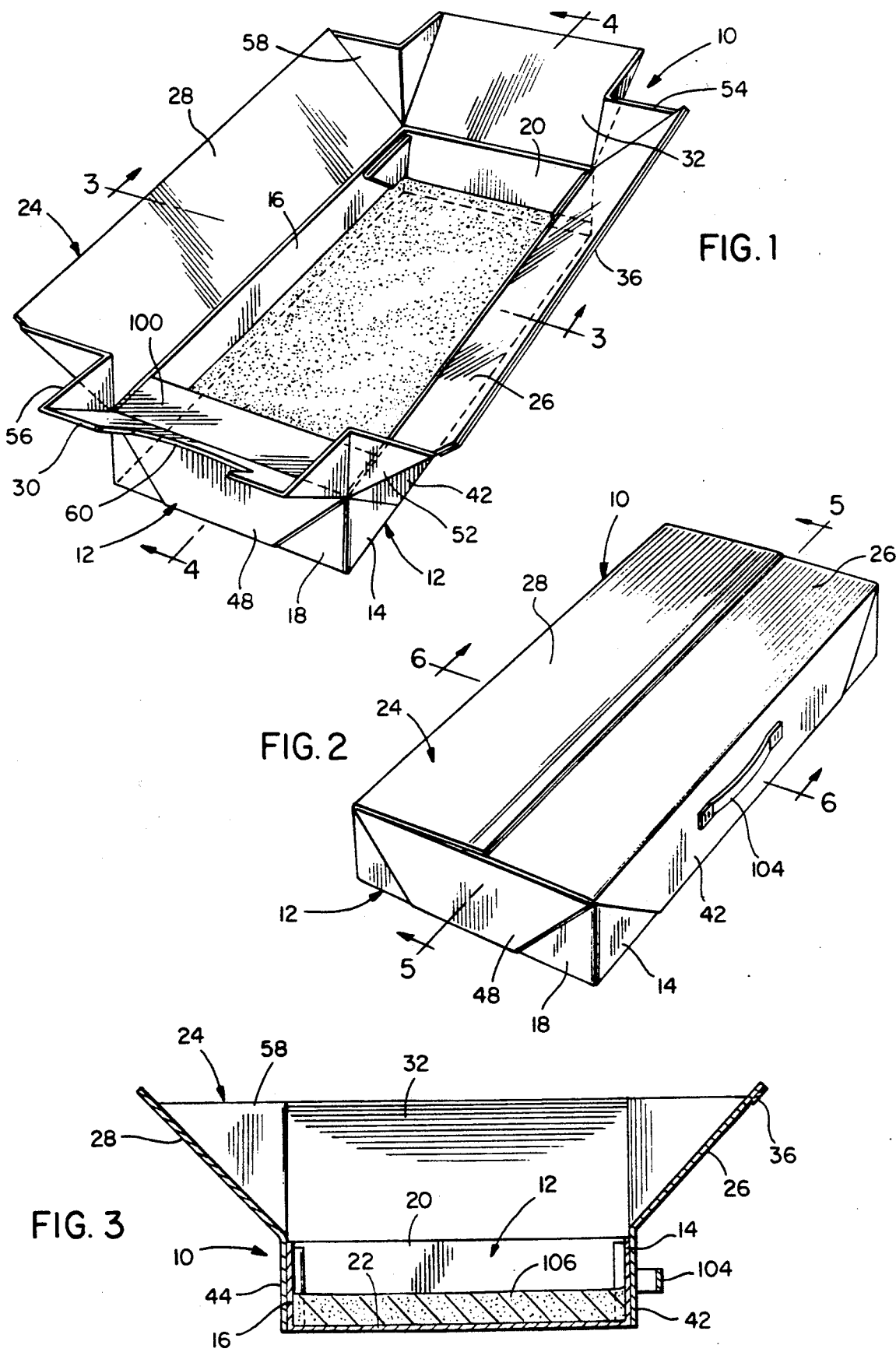

LITTER MARKETING, USE AND DISPOSAL BOX

BACKGROUND OF THE INVENTION

1. Field of The Invention

This invention relates to a cardboard or other similar material box assembly which may be marketed independently (or containing a flexible sealed bag of litter material) and opened, after purchase, in a manner which opens at least substantially the entire upper side of the box and provides the box with upwardly and outwardly inclined flaps on at least three sides thereof. A predetermined quantity of litter material may be disposed within the box and used by one or more cats. Then, the box assembly may be closed in a fully sealed manner for disposal of the box and its used contents.

2. Description of Related Art

Various different forms of litter boxes heretofore have been provided such as those disclosed in U.S. Pat. Nos. 4,014,292, 4,164,314, 4,501,226, 4,779,567, 4,782,788 and 4,800,842. However, these previously known forms of litter boxes do not include the overall structural and operational features of the litter marketing, use and disposal box of the instant invention.

SUMMARY OF THE INVENTION

The litter box assembly of the instant invention utilizes a heavy gauge material and generally rectangular box which is generally rectangular in plan shape and includes upstanding opposite longitudinal sides as well as upstanding opposite transverse end sides integrally joined at the corners of the box by triple folded integral corner sections, whereby the upwardly opening box may be seamless and link proof (particularly if the side of blank of which the box is constructed defining the inner surfaces thereof is coated with a non-porous coating). The box may be constructed of biodegradable material and a generally rectangular flap blank (having a center opening therein) is provided, including beveled corners. The flap blank is of considerably thinner gauge material than the material of which the box is constructed and includes inner opposite side and end flaps secured to the opposite sides and end walls of the box and outer opposite side and end flaps joined by integral and reversibly foldable beveled corner portions with the outer flaps being disposed in positions extending generally 45 degrees upwardly and outwardly from the opposite sides and ends of the box, when the box is disposed for usage. One of the outer end flaps has a deep entrance notch formed therein through which the lower portion of a cat entering the box from one end may pass. After litter has been placed in the box and the box has been used, the outer opposite side and end flaps are foldable inwardly over the open upper side of the box in a manner completely closing and sealing the upper side of the box, after which the box and its used contents may be disposed of.

In addition, the end of the box including the deep notch in the outer end flap thereof for entrance of a cat thereinto includes an inwardly and upwardly inclined deflector panel whereby litter being pawed theretoward from the center of the box will be deflected downwardly and into the box.

It is to be noted that both the blank of which the heavy gauge box is constructed and blank of which the flaps are constructed are substantially rectangular in configuration thereby minimizing material wastage in the construction of the box blank and flap blank.

The main object of this is to provide a litter box assembly which may be marketed in a closed condition and containing, if desired, a sealed flexible package of litter to be used within the box.

Another object of this is to provide a litter box which may be readily opened for use after purchase.

Still another important object of this invention is to provide a litter box which, when opened for use, defines upwardly and outwardly inclined flaps projecting upwardly and outwardly from the upper marginal edges of the box in order to prevent litter being pawed by a cat within the box from being thrown outwardly thereof.

Another object of this invention is to provide a litter box in accordance with the preceding objects which, subsequent to usage thereof, may be completely closed and sealed for disposal of the box and its contents.

Yet another object of this invention is to provide a litter box which is as hygienic as reasonably possible.

A further object of this invention is to provide a litter box which is as reasonably sanitary as is reasonably possible for contact by humans after usage of the box.

Still another important object of this invention is to provide a litter box which is biodegradable.

A final object of this invention to be specifically enumerated herein is to provide a litter box in accordance with the preceding objects and which will conform to conventional forms of manufacture, be of simple construction and easy to use so as to provide a device which will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the litter box in an open position and with the prescribed quantity of litter therein;

FIG. 2 is a perspective view of the litter box in a closed condition;

FIG. 3 is an enlarged transverse vertical sectional view taken substantially upon the plane indicated by the section line 3—3 of FIG. 1;

DESCRIPTION OF THE PREFERRED EMBODIMENT

Figure 4:
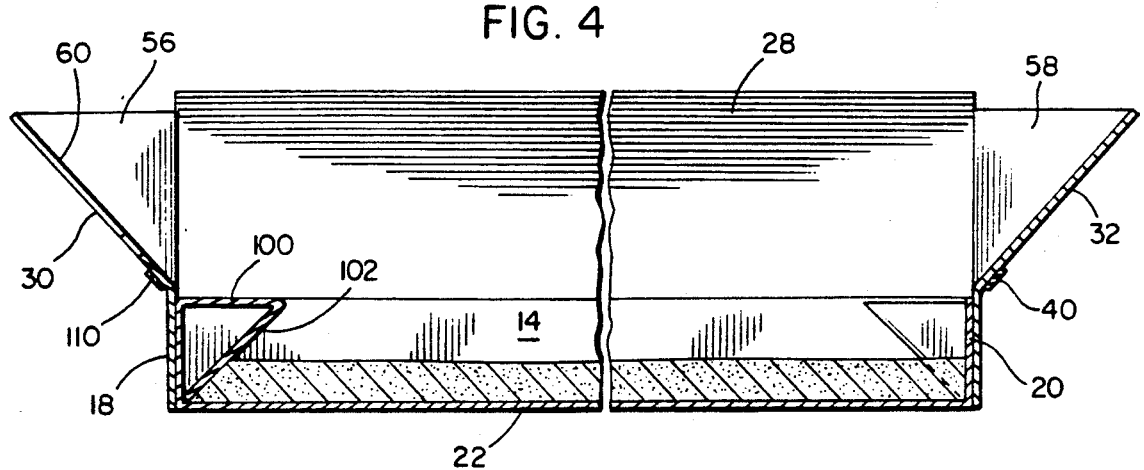
FIG. 4 is an enlarged fragmentary longitudinal vertical sectional view taken substantially upon the plane indicated by the section line 4—4 of FIG. 1.

Referring now more specifically to the drawings the number 10 generally designates the litter box assembly of the instant invention. The assembly 10 includes a litter box generally referred to by the reference numeral 12 incorporating upstanding opposite sides 14 and 16, upstanding opposite ends 18 and 20 extending between and interconnecting corresponding ends of the sides 14 and 16 and a bottom 22 extending between and interconnecting the lower margins of the sides and ends.

In addition, the assembly 10 includes a flap assembly referred to in general by the reference numeral 24 including opposite side flaps 26 and 28 and opposite end flaps 30 and 32, the outer margin 34 of the flap 26 including a double adhesive sided tape 36 adhesively secured to the outer surface thereof and the inner margins 38 of the end flap 32 and the inner margin of flap 30 including double adhesive sided tape 40 and 110, respectively, adhesively secured to the outer surface thereof.

The inner margins of the flaps 26, 28, 30 and 32 include integral tabs 42, 44, 46 and 48 supported therefrom along fold lines 42', 44', 46', 46' and 48'.

Figure 9:
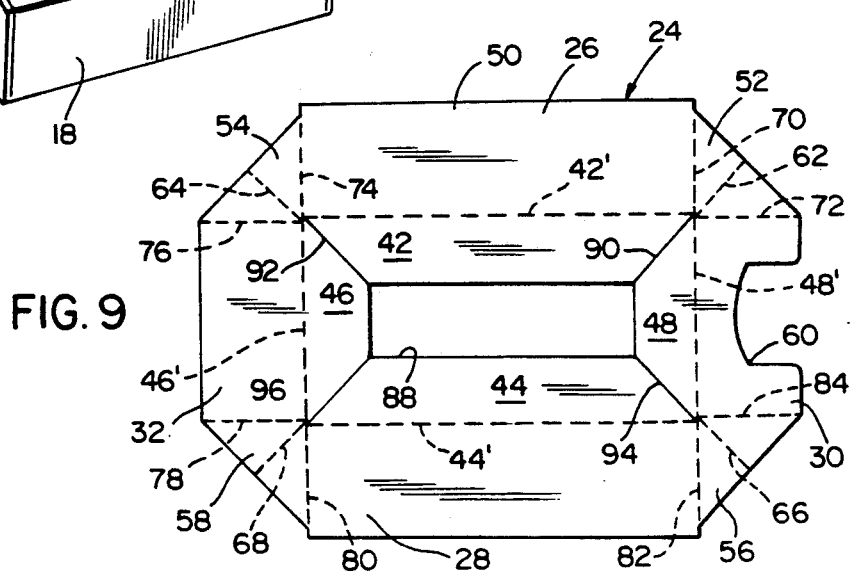
FIG. 9 is a plan view of the flap defining blank in a non-folded condition.

The flap assembly 24 is constructed from a generally rectangular blank 50 illustrated in FIG. 9 including beveled corner sections 52, 54, 56 and 58, the flap 30 including a wide and deep notch 60 formed in its outer margin.

The corner sections 52, 54, 56 and 58 are foldable inwardly along diagonal fold lines 62, 64, 66, and 68 and the corner section 52 is foldable inwardly along fold lines 70 and 72 relative to the flaps 26 and 30, the corner section 54 is foldable inwardly along fold lines 74 and 76 relatively to the flaps 26 and 32, the corner section 58 is foldable inwardly along fold lines 78 and 80 relative to the flaps 32 and 38 and the corner section 66 is foldable inwardly along fold lines 82 and 84 relative to the flaps 28 and 30.

Figure 7:
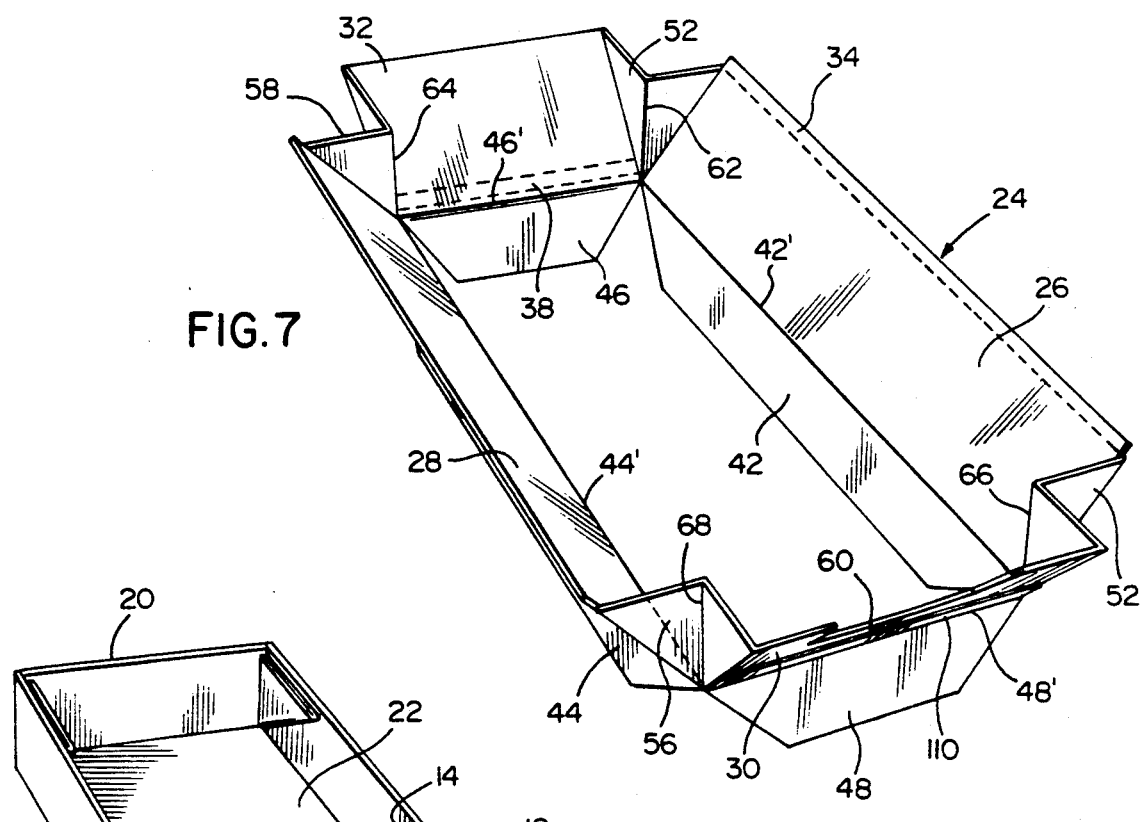
FIG. 7 is a perspective view of the flap defining blank of the instant invention in its folded operative position.

The blank includes a central rectangular opening 88 and the portion of the blank 50 between the opening 88 and the fold lines 42', 44', 46' and 48' is divided into the tabs 42, 44, 46 and 48 by diagonal slits 90, 92, 94, and 96 formed in the blank 50. The tabs 42, 44, 46 and 48 are folded downwardly along the fold lines 42', 44', 46' and 48' and adhered to the outer surfaces of the sides 14 and 16 and the ends 18 and 20 see FIGS. 1 and 7.

Figure 5:
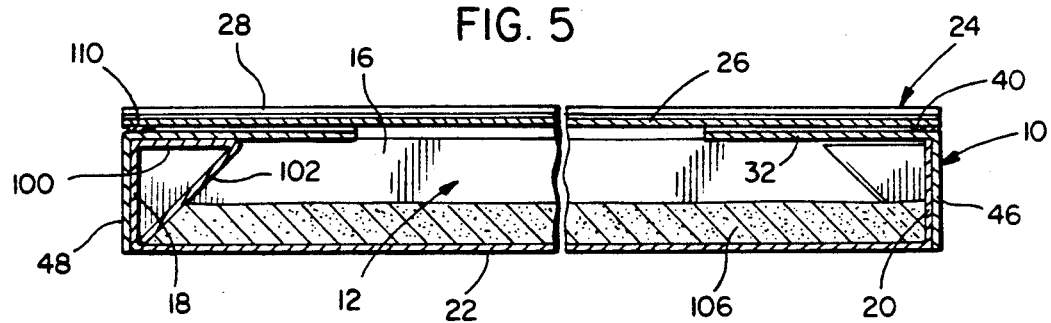
FIG. 5 is a fragmentary enlarged longitudinal vertical sectional view taken substantially upon the plane indicated by the section line 5—5 of FIG. 2
Figure 6:
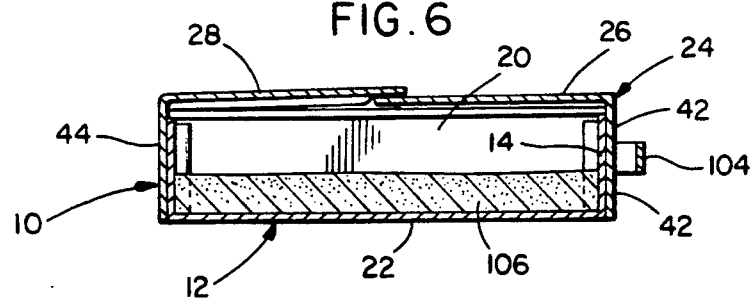
FIG. 6 is an enlarged transverse vertical sectional view taken substantially upon the plane indicated by the section line 6—6 of FIG. 5.
Figure 10:
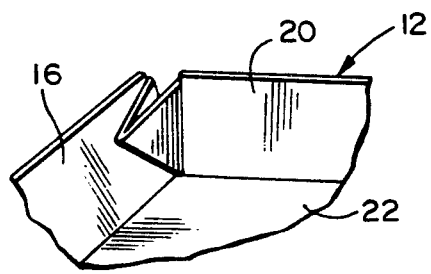
FIG. 10 is a fragmentary perspective view of one corner portion of the ox blank being folded to form the upper left hand corner of the box illustrated in FIG. 8.
Figure 8:
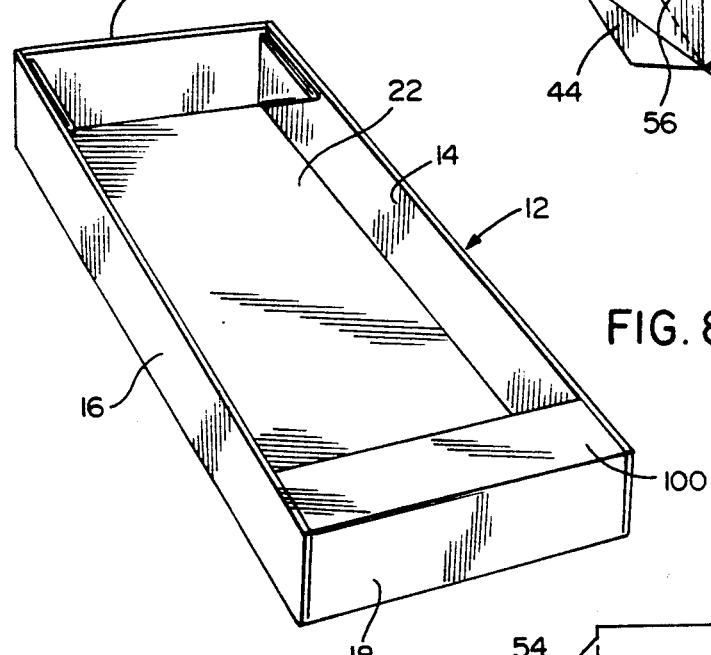
FIG. 8 is a perspective view of the box unit in a folded condition.

The box 20 is also constructed of a generally rectangular blank (not shown) similar to the blank 50 but including square corner sections as opposed to the triangular corner sections 52, 54, 56 and 58 and the blank of which the box 12 is constructed further does not include a notch corresponding to the notch 60. Also, the blank of which the box 12 is constructed does not include the equivalent of the opening 88 or the slits 90, 92, 94, and 96 but does include two additional end flaps 100 and 102 forming outward extensions of the flap of the blank of which the box 12 is constructed corresponding to the flap 30. The square corner sections of the blank of which the box 12 is constructed corresponding to the corner sections 52, 54, 56 and 58 are slightly notched inwardly from the free margins of the sides 14 and 16 and the ends 18 and 20 and are folded inwardly over and secured to the inner surfaces of the corresponding ends of the sides 14 and 16 as may best be seen from FIG. 4 and 8 of the drawings with the inwardly folded corner portions of the blank comprising the box 12 spaced slightly below the upper margins of the sides 14 and 16. This allows the end flap 100 to be folded inwardly over the corresponding inwardly folded and secured corner sections of the blank of which the box 12 is constructed in the manner illustrated in FIG. 5 and the end flap 102 to be further folded inwardly and downwardly to define a deflector flap for downwardly deflecting litter thrown there against. The undersurfaces of the opposite ends of the end flap 100 may be secured to the corresponding inwardly folded corner portions of the blank comprising the box 12 and it will be noted from FIG. 5 that the upper surface of the end flap 100 is substantially flush with the upper margins of the opposite sides 14 and 16.

After the tabs 42, 44, 46 and 48 are secured in any convenient manner to the outer surfaces of the opposite sides 14 and 16 and the ends 18 and 20, the flaps 26, 28, 30 and 32 may be closed by downwardly depressing the free marginal edges of the flaps 26 and 28 to substantially horizontal co-planar positions, inwardly folding the end flaps 30 and 32 and thereafter inwardly folding the flaps 26 and 28 with the free edge of the flap 28 overlying the free edge of the flap 26, the double side adhesive tapes 36 and 40 initially having release strips (not shown) disposed thereover. The closed litter box 12 may then be wrapped in a suitable plastic wrap and marketed, the outer side of the tab 42 having a convenient handle 104 secured thereto. The handle 104 may be enclosed within the aforementioned suitable wrap for the box 12 and the interior of the box 12 may have a sealed flexible package (not shown) of litter 106 disposed therein.

When it is desired to use the litter box 12 after purchase, the outer wrap is removed and the box is opened to the condition thereof illustrated in FIG. 1. Then, if the box contained a package of litter 106, the litter package may be opened and the litter 106 may be placed within the box 12 to the approximate levels thereof illustrated in FIGS. 1, 3, 4, 5 and 6.

A cat wishing to use the box may enter the same conveniently through the notch 60 and if the cat has a tendency to paw the litter 106, such litter will be thrown lengthwise of the box and against the inclined end flap 102 to be deflected back downwardly toward the bottom 22 of the box 12. Of course, the cat may exit the box 12 over either of the flaps 26, 28, 30 or 32.

When it is desired to dispose the box 12 and its contents, the release strips over the adhesive strips 36, 40 and 110 are removed, the side flaps 26 and 28 are depressed downwardly to substantially horizontal positions and the end flaps 30 and 32 are folded inwardly over the opposite ends of the box. Thereafter, the opposite side flaps 26 and 28 are folded inwardly over the end flaps 30 and 32 with the adhesive strips 40 and 110 downwardly adhering and sealing closed the corresponding ends of the flaps 26 and 28 and the strip 36 downwardly adhering and sealing securing the free edge of the flap 28 over the free edge of the flap 26

In this manner, the litter box assembly 10 is fully sealed closed and may be carried by the handle 104 to a point of refuse collection.

Any suitable materials may be used in the construction of the box 12 and flap assembly 24. However, it is preferable that such materials be biodegradable and that any moisture sealant coating on the inner surfaces of the box 12 also be biodegradable, if possible.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A litter marketing, use and disposal box assembly including an elongated upwardly opening box incorporation opposite upstanding sides having upper and lower margins, opposite upstanding ends extending between and interconnecting corresponding ends of said sides and also including upper and lower margins and a bottom extending between and interconnecting said lower margins of said sides and ends, said upper margins of said sides including upwardly and outwardly inclined flaps and the upper margin of at least one of said ends including an upwardly and outwardly inclined flap with the adjacent ends of said end and side flaps being joined by integral foldable corner sections, said end flap being foldable inwardly over the corresponding end of said box and said side flaps being foldable inwardly over the opposite sides of the interior of said box and said end flap with the free marginal edges of said side flaps being disposed in overlapped relation, first securing means carried by said one end flap operative to secure the corresponding ends of said side flaps thereover and second securing means carried by at least one of the free marginal edges of said side flaps operative to secure the last mentioned free marginal edges together in overlapped relation to thereby close said box assembly.

2. The box assembly of claim 1 wherein the other of said ends also includes an additional upwardly and outwardly inclined end flap integrally joined at its opposite ends to the adjacent ends of said side flaps by integral foldable corner portions, said additional end flap being foldable inwardly over the corresponding end of said box, said second securing means also including additional securing means carried by said additional end flap operative to secure the corresponding ends of said side flaps thereover.

3. The assembly of claim 2 wherein said first, second and additional securing means includes adhesive strips carried by the respective flaps.

4. The assembly of claim 2 wherein the free edge of said additional end flap includes a wide outwardly opening notch formed therein.

5. The assembly of claim 1 wherein said box is constructed of a generally rectangular blank including a central portion defining said bottom and peripheral portions integrally joined to the sides and ends of said bottom defining said sides and ends of said box when folded into positions generally normal to said bottom, the portions of said blank defining said sides and ends having adjacent ends thereof joined by integral corner portions which are folded inwardly and against each other and secured to the inner surfaces of the corresponding ends of said sides.

6. The assembly of claim 2 wherein said side and end flaps comprise outer marginal portions of a generally rectangular flap blank including inner marginal portions disposed about a generally rectangular opening formed centrally in said flap blank, corresponding outer and inner marginal portions being disposed on opposite side of fold lines of said flap blank adjacent outer marginal portions of said flap blank being integrally joined by foldable corner portions, adjacent inner marginal portion of said flap blank being separated from each other by diagonal slits, said inner marginal portions being adhesively secured to the outer surfaces of said sides and ends with said fold lines extending along the upper margins of said sides and ends.

7. The assembly of claim 6 wherein said box is constructed of a generally rectangular box blank including a central portion defining said bottom and peripheral portions integrally joined to the sides and ends of said bottom defining said sides and ends of said box when folded into positions generally normal to said bottom, the portions of said box blank defining said sides and ends having adjacent ends thereof joined by integral corner portions which are folded inwardly and against each other and secured to the inner surfaces of the corresponding ends of said sides.

8. The assembly of claim 7 wherein said blanks are constructed of biodegradable material.

9. The assembly of claim 8 wherein the outer surface of at least one of the side inner marginal portions of said flap blank includes a handle supported therefrom.

10. The box assembly of claim 1 wherein the end of said box remote from said end flap includes an inclined flap extending between said bottom and the upper margins of said sides operative to downwardly deflect litter horizontally projected theretoward into the bottom of said box.

* * * * *